Sept. 6, 1932.　　　A. J. JACOBSEN ET AL　　　1,876,500
EXTRACTING AND INSERTING DEVICE
Filed Aug. 23, 1929　　　3 Sheets-Sheet 1
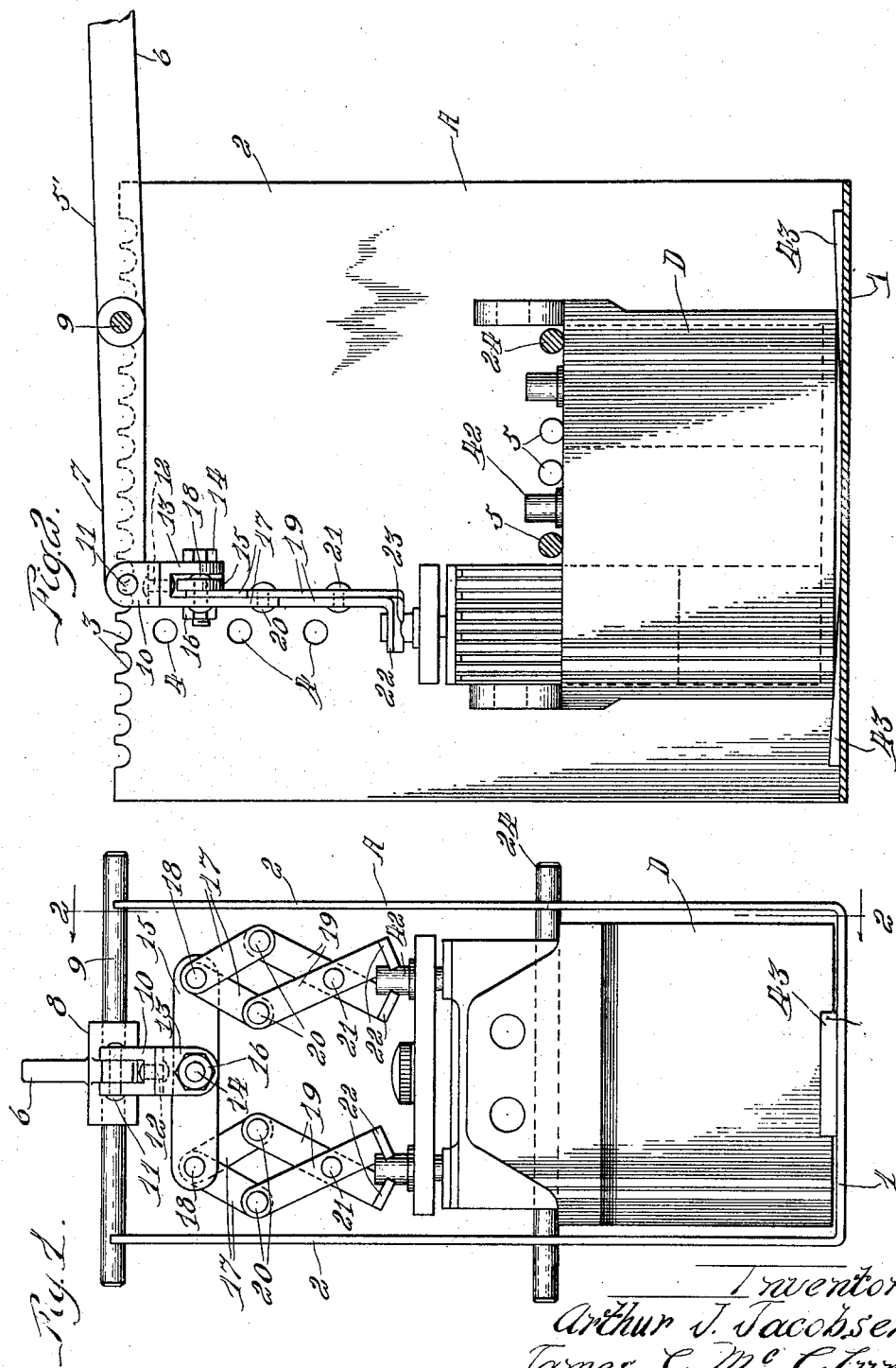

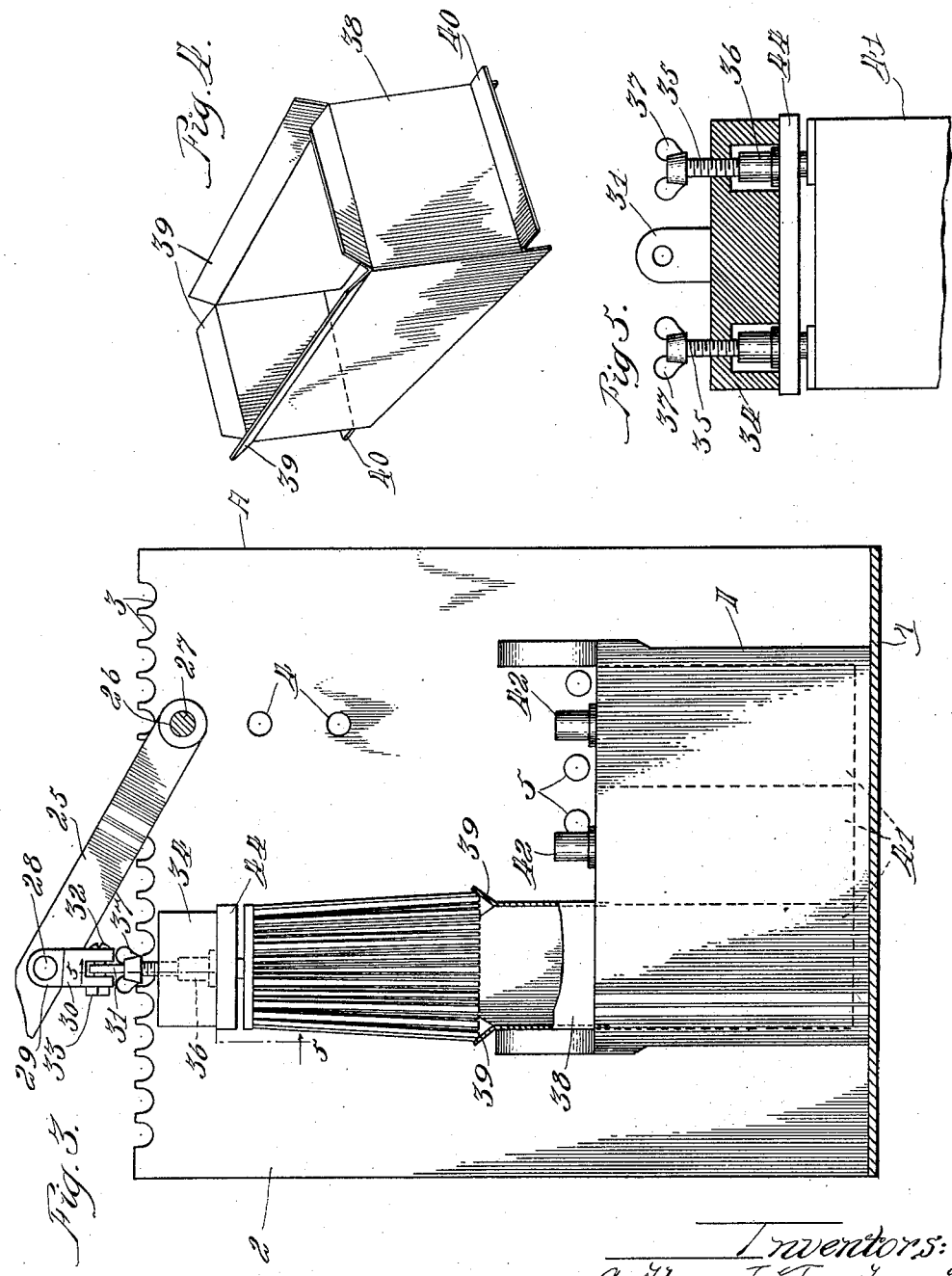

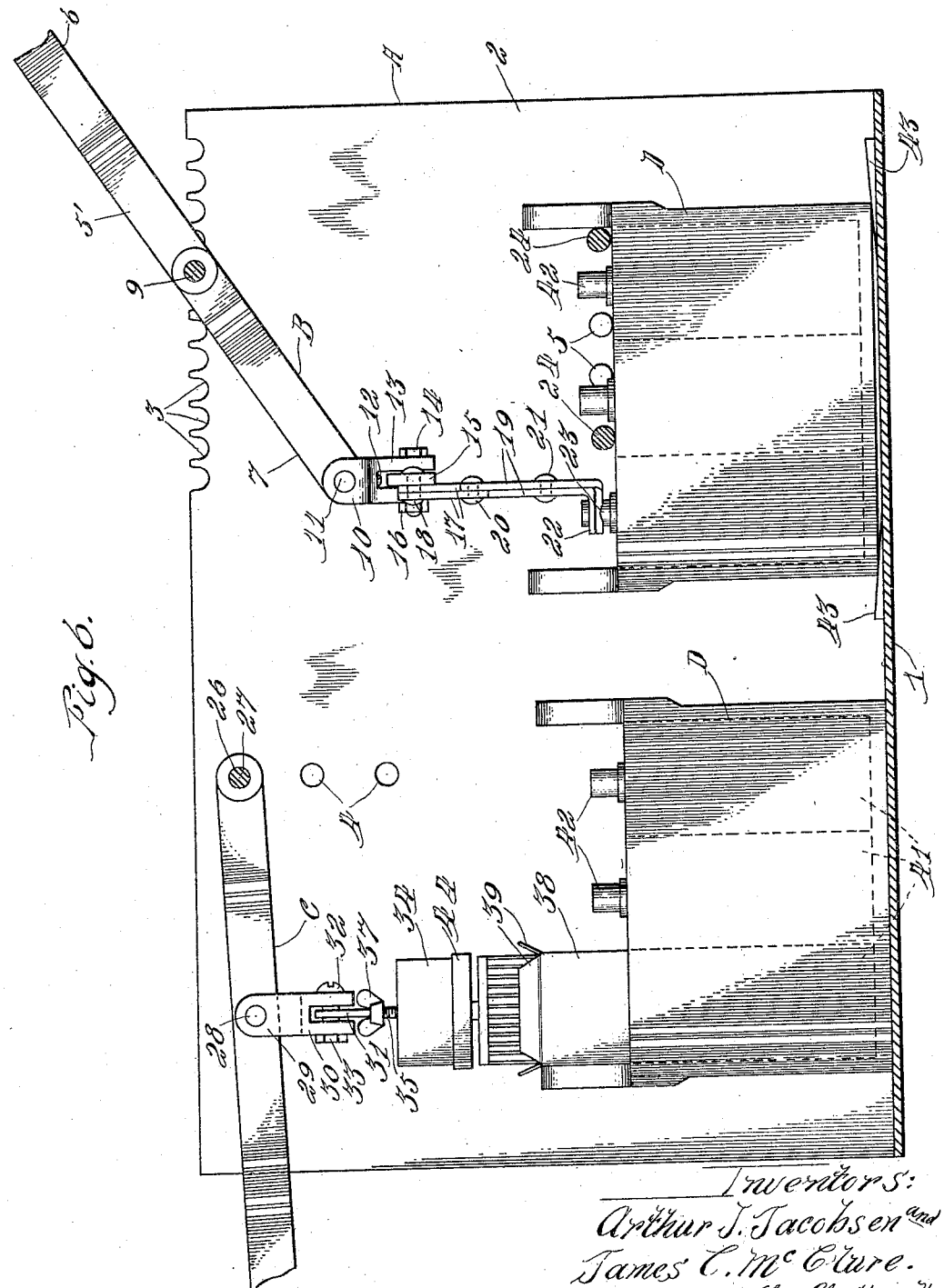

Patented Sept. 6, 1932

1,876,500

UNITED STATES PATENT OFFICE

ARTHUR J. JACOBSEN AND JAMES C. McCLURE, OF CHICAGO, ILLINOIS

EXTRACTING AND INSERTING DEVICE

Application filed August 23, 1929. Serial No. 387,958.

This invention relates to extracting and inserting mechanism and is more particularly adapted for extracting or withdrawing cells from storage batteries and for inserting cells after repair into battery compartments.

A primary object of the invention is to provide mechanism of simple and staunch construction which will enable the operator to remove used or defective cells from batteries in a very brief time and with a modicum of effort and after repair to reintroduce the cells within the battery compartments readily and without injury to the cells or compartments. Another object of the invention is to provide mechanism by which the steps of removal of cells and insertion of repaired cells may be carried on conveniently in succession in a single supporting apparatus. A further object is to provide means for rendering the repaired cell readily insertable within the battery compartment and for exerting pressure evenly upon the terminal posts and cover of the cell in order to prevent injury thereto. Another object is to provide means for gripping the terminal posts of a cell so that the cell may be readily removed thereby. Another object is to provide means whereby in the lifting or inserting operation the fulcrum of the operating lever may be adjusted so as to exert tension or pressure from the desired angle. Another object is to provide adjustable means for securing the battery and some of the cells rigidly against vertical movement during the lifting or inserting operations. Other objects and advantages will appear as the description proceeds.

The invention is fully described in the following specification and shown in the accompanying drawings in which:

Figure 1 is a view in end elevation of apparatus embodying my invention and showing a cell partially removed from the storage battery; Fig. 2 is a sectional side view, the section being taken as indicated at line 2 of Fig. 1; Fig. 3 is a sectional view, similar to Fig. 2, showing the inserting apparatus about to introduce a repaired cell into a storage battery; Fig. 4 is an enlarged detail view in perspective of an inserter form, shown in Fig. 3; Fig. 5 is an enlarged detail view of a presser plate which is employed to exert pressure upon the top wall of the cell; and Fig. 6 is a sectional side view of apparatus in which extracting and inserting operations may be carried on simultaneously within the channel supporting member.

In the illustration given, A represents the channel or U-shaped supporting member; B designates the extracting apparatus, C the inserting apparatus; and D a storage battery.

The member A is preferably U-shaped and has a bottom wall 1 and two vertical side walls 2, the two side walls being spaced apart sufficiently to receive between them a storage battery D. Any suitable material may be employed for the construction of member A, but we prefer to employ pressed steel plate. The plate is preferably of such thickness that it will serve as a rigid support for the lifting and inserting apparatus and at the same time be light enough to make the entire apparatus portable. A $\frac{1}{16}$th inch pressed steel plate has been found to be satisfactory for this purpose. It may be readily blanked, cut and punched to form the channel member, as hereinafter described. The walls of member A are preferably provided at their upper edges with a row of indentations or semi-circular bearings 3 and at an intermediate portion with perforations 4. These perforations if desired, may be arranged in horizontal as well as in vertical lines.

Also at an intermediate portion the walls are provided with perforations 5 which are in horizontal alinement and which are preferably positioned so as to be barely above the top of storage battery D. The walls may be provided with a plurality of rows of openings or perforations 5 in order to permit adjustment to batteries of varying heights.

The lifting or extracting apparatus B comprises a lever 5 which is provided with a handle portion 6 and a lifting or extension portion 7. Lever 5 is preferably equipped at an intermediate point with a hub or boss 8 which may be formed integrally with the lever and which is bored to receive a shaft or bar 9. Shaft 9 may, if desired, be secured within the boss 8 or, if desired, it may be removable therefrom. The forward end of extension 7 is apertured and is secured to a furcated or U-shaped connection 10 by means of a rivet 11. Swivelly connected to member 10 by means of rivet 12 is an inverted U-shaped member 13 which is apertured near its lower end to receive bolt 14. A centrally apertured equalization bar 15 is secured within bar 13 by bolt 14 and nut 16. Secured to each end of equalization bar 15 is a pair of links 17, the ends of which are pivotally connected to the end of the bar by means of a single rivet 18. A second pair of links 19 make pivotal connection with the lower extremities of links 17 by means of rivets 20.

Links 19 are connected at an intermediate point by rivet 21 and the lower end portions of links 19 are preferably turned outwardly in a horizontal line to form gripping shoes 22. These shoes preferably have a portion cut away on their inner edges so as to enable them to partially inclose the terminal posts of a cell, as illustrated in Fig. 1. Also the gripping shoes 22 preferably have a portion cut away on their lower forward edge, at 23, so as to form a cutting edge which enables the shoes to cut a hold into the terminal posts of the cell during the lifting operation.

The shaft or bar on 9 is adapted to rest within the indentations or bearings 3 and may readily be moved from one pair of indentations to another so as to enable tension to be exerted upon the cell from the desired angle.

Cross bars or tie bars 24 may be inserted through perforations 5 so as to lock the battery and some of the cells against vertical movement when one of the cells is being withdrawn.

The inserting apparatus C comprises a lever 25 having a perforation 26 at one end adapted to receive a pivot shaft or bar 27 which may be extended through perforations 4 of walls 2.

At an intermediate point the bar 25 is secured by means of rivet 28 to a depending U-shaped member 29. Swivelly connected thereto is an inverted U-shaped member 30 to which a bar 31 is in turn connected by means of bolt 32 and nut 33. The bar or metal strap 31 is rigidly secured at its lower end to a pressure block or plate 34 which is preferably formed of a hard fibre board. The plate or block 34 is preferably drilled and tapped for adjusting screws 35, which are provided at their lower ends with shoes 36 and at their upper ends with wing handles 37. The plate 34 is preferably made of hard fibre board and in the preferred form is slightly smaller than the top of the battery cell. I prefer to have the plate $\frac{1}{16}$ inch smaller on each side than the cell top upon which it rests.

To render the plates of the cell more easily insertable within the battery compartment, I employ a guide form or box 38, which may also be formed of pressed steel.

The box 38 has opposite sides removed so as to permit passage of the cell therethrough. The upper edges 39 are preferably slitted at the corners and bent back to form an enlarged opening serving to guide the plates of the cell into narrower compass so that it may be pressed easily into the battery compartment. The box is slitted at corners on the lower side and the end pieces bend outwardly to form shelves or catches 40. These serve to prevent the box from being forced into the battery compartment when pressure is exerted upon the cell.

D represents any battery of the ordinary storage type. For the purpose of illustration it is provided with compartments and three cells 41. The numeral 42 designates the terminal posts of each cell.

In the operation of the apparatus for removing the cell of a battery, the battery is placed within the channel or U-shaped member and secured against vertical movement by rods or bars 24 which are passed through perforations 5 in the walls of the channel member. To secure the battery firmly in position against the rods or bars 24, wedges 43 may be driven between the bottom of the battery and the lower wall 1 of member A. The lifting lever 5 is then placed upon the top edges of walls 2 so that the link members will hang adjacent the cell terminal posts 42, and rod 9 upon which lever 5 is supported is allowed to rest upon indentations 3 which thus serve as bearings. As the handle 6 of lever 5 is raised, the link members are depressed and the gripping shoes 22 are opened and allowed to engage the terminal posts 42. As the handle 6 of the lever 5 is depressed the tension exerted by the equalization bar 15 upon links 17 tends to clamp the shoes 22 against the lead terminals 42 so as to cut a grip in the terminal posts. Further downward movement of the handle causes the cell to be raised, the equalization bar 15 causing equal tension to be exerted upon the oppositely disposed terminal posts 42 and thus preventing binding against the battery compartment. After the battery has been removed the link gripping members may be released from engagement with terminal posts 42 by moving the handle of levers 5 slightly upwardly.

In some batteries the cells are arranged end-to-end rather than side-to-side as shown in the battery illustrated. With this arrangement the terminal posts 42 will be alined longitudinally of channel member A and centrally of the battery. The swivel parts 10, 12 and 13 permit the link members to be turned so as to engage the terminals of this type of battery cell and the operation of removing cells from such batteries is the same as above described.

In the operation of inserting repaired cells, the bars 24 are preferably removed and the wedges 43 are also removed. The guide form or box 38 is placed within the empty compartment so that horizontal flanges 40 engage the side walls of the battery box. In practice, it is found that the repaired cell, because of the new lead plates and new insulation plates has a tendency to flare out at its lower end in a fan-like form. The enlarged mouth 39 of box 38 embraces the flared lower portion of the cell and as the cell is urged downwardly converges the bottom portion until it is brought into sufficiently compact form to permit it to enter a compartment of the battery. A rod or bar 27 is passed through perforations 4 of the two walls of channel member 8 and through perforation 27 in the end of lever 25. If desired, the openings 4 may be arranged in a horizontal line so as to permit longitudinal adjustment of the rod 27.

The cell which is to be inserted, is placed directly above the empty compartment with its lower flared end resting upon the enlarged mouth 39 of box 38. Lever 25 is then lowered until plate or block 34 rests upon the top 44 of cell 41, the shoes 36 being brought into alinement with the terminal posts 42 of the cell. The wing screws 35 are then adjusted until the lower surface of block 34 and the shoes 36 exert an even pressure upon the terminals 42 and cell top 44. In practice it has been found that upon the removal of the battery straps or connections, the cell terminal posts are not of the same height and therefore in order to secure an equal exertion of pressure upon the two posts and upon the top surface of the cover, the adjustment of the wing screws is made. The further downward pressure upon the lever 25 forces the battery plates through the box 38 and into the battery compartment; the lever is then lifted and the form guide 38 is removed.

It will be found in the operation of the inserting apparatus described, that when the cell is placed upon form member 39 and a pressure is exerted thereon by plate 34, that the battery will tend to adjust itself longitudinally so that the cell is centered with respect to the plate 38.

In the modified form illustrated in Fig. 6, the channel member A is made sufficiently long to allow the extracting member B and the inserting member C to be operated simultaneously in the same channel member. It will be observed that in this form of apparatus, the batteries to be repaired may be moved in a continuous line through the channel member, the cells being removed on the incoming side and repaired cells being inserted on the outgoing side. If desired, any suitable means for conveying the batteries through the channel member may be employed.

While we have described a supporting apparatus having a U or channel-shape, other suitable forms which provide the necessary support for the lifting and pressing levers may be employed. Also, the number and arrangement of the perforations and indentations shown may be varied to provide the desired adjustment and to adapt the apparatus for handling batteries of varying dimensions.

It will obviously be within the spirit of our invention to employ means other than the specific means disclosed for exerting pressure and tension upon the inserting and extracting apparatus. For example, instead of the levers 5 and 25, an air-thrust cylinder, electrically actuated plunger mechanism, or any other suitable means may be employed.

It will be observed that with the mechanism disclosed, cells of a battery may be removed readily, with little exertion and without injury to battery walls or other cells and that the repaired cells may be readily inserted within the tight compartments of the battery with very little effort.

The foregoing detailed description has been given for clearness of understanding only and no unnecessary limitations should be understood therefrom, but the appended claims should be construed as broadly as permissible in view of the prior art.

We claim.

1. In a device of the character set forth a supporting member comprising two walls, said walls being provided at their upper edges with pivot rod bearings and at an intermediate point with perforations, tie rods adapted to extend through said perforations and to secure a storage battery against vertical movement, a lifting lever supported upon a pivot rod journalled in said pivot bearings and means depending from said lever adapted to engage portions of a battery cell.

2. In a device of the character set forth a channel member comprising a bottom wall and two vertical walls, said walls being provided at their upper edges with indentations and at intermediate points with perforations, tie rods extending through said perforations and adapted to secure a storage battery against vertical movement, wedges insertable between said battery and said bottom wall of the channel member, and a lever supported upon a pivot rod journalled in said indentations and having depending means adapted to engage a portion of a battery cell.

3. In a device of the character set forth a pair of vertical walls adapted to receive a storage battery therebetween and having their upper edges equipped with indentations, a lifting lever supported by a bar journalled in said indentations, an equalizing bar pivotally connected to said lever, and link members connected to the end of said equalizing bar, said link members having their lower extremities provided with means for gripping the terminal posts of a battery cell.

4. In a device of the character set forth, a supporting member comprising two walls, said walls being provided at their upper edges with pivot rod bearings and being adapted to receive between them a storage battery, means for securing the storage battery against vertical movement, a lifting lever supported upon a pivot rod journalled in said pivot bearings, and means depending from said lever adapted to engage portions of a battery cell.

5. In a device of the character set forth, a pair of vertical walls adapted to receive a storage battery therebetween and having their upper edges equipped with pivot rod bearings, a lifting lever supported by a rod journalled in said bearings, an equalizing bar pivotally connected to said lever, means depending from said lever and adapted to engage the terminal posts of a battery cell, and means for securing said battery against vertical movement.

ARTHUR J. JACOBSEN.
JAMES C. McCLURE.